United States Patent [19]

Murphy

[11] Patent Number: 5,266,175
[45] Date of Patent: Nov. 30, 1993

[54] CONVERSION OF METHANE, CARBON DIOXIDE AND WATER USING MICROWAVE RADIATION

[75] Inventor: William J. Murphy, Brights Grove, Canada

[73] Assignee: Exxon Research & Engineering Company, Florham Park, N.J.

[21] Appl. No.: 985,983

[22] Filed: Dec. 4, 1992

Related U.S. Application Data

[63] Continuation-in-part of Ser. No. 786,485, Nov. 1, 1991, abandoned, which is a continuation of Ser. No. 560,522, Jul. 31, 1990, abandoned.

[51] Int. Cl.$^5$ ............... C01B 3/06; C01B 3/24
[52] U.S. Cl. ............... 204/157.43; 204/157.47; 204/157.52
[58] Field of Search ............ 204/157.43, 157.47, 204/157.52

[56] References Cited

U.S. PATENT DOCUMENTS

| | | | |
|---|---|---|---|
| 3,328,276 | 6/1967 | Schmidt et al. | 204/170 |
| 3,663,394 | 5/1972 | Kawahara | 204/168 |
| 4,234,402 | 11/1980 | Kirkbride | 204/162 |
| 4,279,722 | 7/1981 | Kirkbride | 204/162 |
| 4,474,625 | 10/1984 | Cohen et al. | 148/1.5 |
| 4,574,038 | 3/1986 | Wan | 204/162 |
| 4,721,828 | 1/1988 | Withers | 585/500 |
| 4,919,974 | 4/1990 | McCune et al. | 427/249 |
| 4,975,164 | 12/1990 | Ravella et al. | 204/156 |
| 5,015,349 | 5/1991 | Suib et al. | 204/168 |

OTHER PUBLICATIONS

Gasner et al., "Microwave and conventional pyrolysis of a bituminous coal", Chemical Abstracts 106: 7281h (1987).

Tanaka et al., "A Stoicheiometric Conversion of $CO_2 + CH_4$ into $2\ CO + 2\ H_2$ by Microwave Discharge", J. Chem. Soc., Chem. Commun., pp. 921–922 (1982).

*Primary Examiner*—Kathryn Gorgos
*Attorney, Agent, or Firm*—James H. Takemoto

[57] ABSTRACT

A mixture of methane, water and carbon dioxide can be effectively converted to carbon monoxide and hydrogen by subjecting the mixture to microwave radiation in the presence of at least one plasma initiator that is capable of initiating an electric discharge in an electromagnetic field.

10 Claims, No Drawings

CONVERSION OF METHANE, CARBON DIOXIDE AND WATER USING MICROWAVE RADIATION

This is a continuation-in-part of U.S. Ser. No. 786,485 filed Nov. 1, 1991 now abandoned, which is a Rule 60 Continuation of U.S. Ser. No. 560,522 filed Jul. 31, 1990, now abandoned.

BACKGROUND OF THE INVENTION

1. Field of the Invention

This invention relates to a method for converting methane and carbon dioxide in the presence of water to carbon monoxide and hydrogen using microwave radiation.

2. Description of Related Art

Microwave energy has been used to convert methane to other hydrocarbons. For example, U.S. Pat. No. 4,574,038 discloses that methane can be converted to ethylene and hydrogen in a batch process at pressures of from 0.3 to 1 atmosphere by subjecting the methane to microwave radiation in the presence of a metal powder catalyst. Another example of methane conversion using microwave energy is disclosed in U.S. Pat. No. 3,663,394.

In addition, the conversion of methane and carbon dioxide into carbon monoxide and hydrogen using a microwave discharge at −5 torr pressure has been disclosed by Tanaka et al, J. Chem. Soc., Chem. Comm., pp. 921–922, (1982). U.S. Pat. No. 4,975,164 discloses the conversion of $C_{2+}$ hydrocarbons to primarily unsaturated hydrocarbons and hydrogen using microwave radiation.

However, none of these publications suggest the particular conversion process described below, which requires the presence of a plasma initiator.

SUMMARY OF THE INVENTION

This invention concerns a method for converting methane and carbon dioxide to carbon monoxide and hydrogen which comprises:

(a) introducing a feed stream containing methane, carbon dioxide from about 0.02 to about 20 wt% water, based on the feed stream, into a reaction zone that contains at least one plasma initiator capable of initiating an electric discharge in an electromagnetic field, (b) subjecting the reaction zone to microwave radiation thereby initiating an electric discharge in said reaction zone, and (c) ionizing the methane, carbon dioxide and water reactants whereby at least a portion of the methane and carbon dioxide are converted to carbon monoxide and hydrogen.

DETAILED DESCRIPTION OF THE INVENTION

This invention requires the presence of methane, carbon dioxide, water, at least one elongated plasma initiator capable of initiating an electric discharge in an electromagnetic field, and a source of microwave energy.

The methane and carbon dioxide may be pure or mixed with other hydrocarbons (e.g., methane may be a component of natural gas), or both may be components of refinery gas or gas streams from a gas producing well. Natural gas, refinery gas or gas streams from gas producing wells contain minor amounts of other low molecular weight hydrocarbons such as ethane, propane, butane and the like which are expected to react in a similar manner to methane. Non-hydrocarbons (e.g. $H_2S$, $N_2$, $H_2$, etc.) may be present in either or both as well. Both can be added to the reaction zone separately or as a mixture.

By initiating the conversion of methane and carbon dioxide in the presence of water, it has been discovered that the energy efficiency or rate of dissociation of methane and carbon dioxide is substantially increased thereby increasing the overall conversion of methane and carbon dioxide into carbon monoxide and hydrogen. The amount of water necessary to enhance the conversion is from about 0.02 to about 20 wt%, based on feed stream to the reaction zone, preferably about 0.1 to about 5 wt%.

The plasma initiator may be essentially any material capable of accumulating an electric charge when placed in an electromagnetic field and then dissipating the charge (or initiating an electric discharge), for example, by ionizing a gas environment. This includes metal initiators, non-metal initiators (including semi-conductors), and composites of metal and non-metal initiators. As used herein, "composite" is meant to include mixtures (or combinations) of metals and non-metals. Examples of suitable metal initiators are tungsten, iron, nickel, copper, their alloys, or mixtures thereof. Preferred metal initiators are tungsten, iron, or mixtures thereof, with iron being particularly preferred. Examples of suitable non-metal initiators include carbon, alumina, manganese dioxide, magnetite, nickel oxide (e.g. NiO), iron oxide (e.g. $Fe_3O_4$), calcium aluminate, cobalt oxide, chromium nitride, iron sulfide (e.g. $FeS_2$, $Fe_{1-x}S$), copper sulfide (e.g. $CuS_2$), or mixtures thereof. Calcium aluminate, carbon, iron oxide, or their mixtures are preferred non-metal initiators, with carbon being particularly preferred. Silica is not a suitable non-metal initiator. However, silica composited with a metal initiator or another non-metal initiator would be a suitable plasma initiator.

Although methane/carbon dioxide conversion in the presence of water can be effected using only one plasma initiator, conversion is enhanced if more than one (e.g., 6 or more) plasma initiators are used. Preferably, a plurality of plasma initiators are used. Most preferably, the plasma initiator will comprise a plurality of metal wire segments. Each plasma initiator should be of at least a minimum length that is sufficient to initiate an electric discharge when placed in an electromagnetic field. However, the precise minimum length of each initiator may vary with the frequency of the microwave source as well as the geometry of the reaction zone and of the initiator.

If more than one plasma initiator is used, a minimum distance should be maintained between each initiator to facilitate dissipation of the electric charge. However, the minimum distance will vary depending upon the frequency of the microwave source. As an example, the minimum distance should be at least about 0.25 cm, preferably at least about 0.5 cm, for a frequency of 2.45 GHz.

The plasma initiators should be elongated, but may be formed, combined, or bent in any convenient shape (e.g., straight, helix, spiral, and the like). Preferably, the initiators should be formed such that there are points or sharp edges at the ends or on the surface of the initiators. Particulate powders are not suitable plasma initiators.

The plasma initiators may be stationary within the reaction zone or they may be in motion. The motion can result from the initiators being fluidized by a gas (e.g. the methane feedstock) or by other means (e.g. an external magnetic field gradient).

The frequency of the microwave source can vary broadly. Typically, the microwave energy will have a frequency of at least 0.3 GHz, with frequencies centered around 0.915, 2.45, 5.80, or 22.0 GHz being presently preferred in North America; particularly frequencies centered around 0.915, 2.45, or 5.80 GHz; especially frequencies centered around 0.915 or 2.45 GHz.

The microwave energy used in this invention may be continuous or pulsed. If pulsed, the duration of on-time pulses can vary broadly, but typically will range from about 1 nanosecond to about 20 seconds, preferably from about 1 millisecond to about 10 seconds, and most preferably from about 0.01 to about 0.2 seconds. The duration of off-time rests can vary broadly as well, but, typically, will range from about 1 nanosecond to about 100 seconds, preferably from about 0.003 to about 60 seconds, and most preferably from about 0.03 to about 5 seconds.

The conversion process of this invention can be practiced at any convenient temperature, including ambient conditions. The subject process has the advantage that pressures of one atmosphere or greater can be employed. Pressures of from about 10 torr to about 15 atm, preferably about 1 to about 2 atm are suitable.

This invention will be further understood by reference to the following Examples which are not intended to restrict the scope of the claims appended hereto.

EXAMPLE 1

Conversion of Methane and Carbon Dioxide

A methane/carbon dioxide mixture (1:1.15 mole ratio) flowing at 75 ml/min (milliliters/minute) at atmospheric pressure was contacted with 0.37 g of a straight tungsten wire (approximately 0.76 mm in diameter and cut into about 47 mm lengths) in a reactor fabricated from a straight piece of quartz tubing, 7 mm in internal diameter. The part of the tube containing the wire was inserted in a WR430 microwave waveguide and positioned approximately one-quarter wavelength from a short circuit plate. The reactor was then irradiated with microwave radiation centered at a 2.45 GHz frequency and pulsed in an on/off cycle (0.07 seconds on in a total of 0.73 seconds) with an average power of 9.8 watts. The methane conversion was calculated to be 48.9% using the following equation:

$$\% \text{ Methane Conversion} = \left[1 - \frac{\text{wt. \% methane in the products}}{\text{wt. \% methane in the feed}}\right] \times 100$$

Similarly, carbon dioxide conversion was calculated to be 43.4% using the following equation:

$$\% \text{ Carbon Dioxide Conversion} = \left[1 - \frac{\text{wt. \% carbon dioxide in the products}}{\text{wt. \% carbon dioxide in the feed}}\right] \times 100$$

The primary products formed were carbon monoxide (an average of 37.6 wt%), hydrogen (an average of 2.4 wt%) and water (an average of 3.1 wt%). The product stream also contained carbon dioxide (an average of 43.0 wt% versus 75.9 wt% in the mixture fed to the reactor), methane (an average of 12.3 wt% versus 24.1 wt% in the mixture fed to the reactor) and small amounts of higher hydrocarbons.

EXAMPLE 2

Effect of Water on the Conversion of Methane and Carbon Dioxide

A methane/carbon dioxide mixture (1:1.15 mole ratio) containing 0.29 wt% water and having a flow rate of 75 ml/min (milliliters/minute) at atmospheric pressure was contacted with 0.37 g of a straight tungsten wire (approximately 0.76 mm in diameter and cut into about 47 mm lengths) in a reactor as described in Example 1 and using the procedure (except that the average power was 9.9 watts) as also described in Example 1. The methane conversion was calculated to be 90.1% and the conversion of carbon dioxide was calculated to be 87.2%.

The primary products formed were carbon monoxide (an average of 79.2 wt%), hydrogen (an average of 4.6 wt%) and water (an average of 3.5 wt%). The product stream also contained carbon dioxide (an average of 9.7 wt% versus 76.2 wt% in the mixture fed to the reactor), methane (an average of 2.4 wt% versus 24.1 wt% in the mixture fed to the reactor) and small amounts of higher hydrocarbons.

EXAMPLE 3

Effect of Water on Conversion of Methane and Carbon Dioxide

Using the apparatus and procedure of example 2 (except that the average power was 10.1 watts and the feed water content was 0.28 wt%), the methane/carbon dioxide/water mixture was converted to carbon monoxide (an average of 78.5 wt%), hydrogen (an average of 4.9 wt%) and water (an average of 3.7 wt%). The methane and carbon dioxide conversions were 89.7 and 87.0% respectively.

In comparing Examples 2 or 3 with Example 1, the addition of a small amount of water to the feed stream results in substantial increases in conversion rates. As can be seen from these data, conversion of methane increases from 48.9% to about 90% and conversion of carbon dioxide from 43.4% to about 87%.

EXAMPLE 4

Conversion of Methane and Carbon Dioxide Using Plasma Initiators

Using the apparatus and procedure of Example 1 (except that the average power was 6.4 watts), a methane/carbon dioxide mixture (1:2 mole ratio) flowing at 15 ml/min was converted to 47.5 wt% carbon monoxide, 1.7 wt% hydrogen, and 2-3 wt% water. Methane and carbon dioxide conversions were 53.6% and 52.6%, respectively.

EXAMPLE 15

Conversion of Methane and Carbon Dioxide Using Plasma Initiators

Using the apparatus and procedure of Example 1 (except that the average power was 7.4 watts), a methane/carbon dioxide mixture (1:~18 mole ratio) flowing at. 10 ml/min was converted to 43.4 wt% carbon monoxide, 0.7 wt% hydrogen, and 2-3 wt% water. Methane and carbon dioxide conversions were 60% and 46.4%, respectively.

EXAMPLE 6

Conversion of Methane and Carbon Dioxide Using Particulate Metal Powder

A methane/carbon dioxide mixture (1:1.09 mole ratio) was passed through an empty quartz glass tube at a total flow rate of 20 ml/min at atmospheric pressure. The tube was irradiated with up to 1170 watts of microwave radiation centered at a frequency of 2.45 GHz, but no plasma was formed and no conversion products obtained. Attempts to initiate a plasma using the discharge from a Tesla coil also failed.

Particulate nickel powder (0.1 g) was then evenly distributed over an approximately 1 cm diameter sintered glass disc contained in a quartz reactor and contacted with the methane/carbon dioxide mixture described above flowing at 20 ml/min through the sintered disc. The reactor was located in a WR430 waveguide positioned approximately one quarter waveguide wave-length from a short circuit plate. The reactor was irradiated with pulsed microwave radiation centered at a frequency of 2.45 GHz and having an on/off cycle of 0.14 seconds on in a total of 3.5 seconds. After 18 minutes onstream at an average power of 1.4 watts, methane and carbon dioxide conversions were calculated to be 1.4% and 1.0%, respectively, with the primary products being 0.7 wt.% carbon monoxide, 0.09 wt.% hydrogen, and 0.15 wt.% water. After an additional 18 minutes onstream, methane and carbon dioxide conversions were calculated to be 1.2% and 0.45%, respectively, with the primary products being 0.56 wt.% carbon monoxide and 0.07 wt.% hydrogen (no water was detected). At higher average power (e.g. 2.6 watts), the powders glowed but no conversion was obtained.

The data in Example 6 show that particulate metal powders are not effective in converting methane and carbon dioxide.

What is claimed is:

1. A method for converting methane and carbon dioxide to carbon monoxide and hydrogen which comprises:
   (a) introducing a feed stream containing methane, carbon dioxide and from about 0.02 to about 20 wt% water, based on the feed stream, into a reaction zone that contains at least one plasma initiator which initiates an electric discharge in an electromagnetic field,
   (b) subjecting the reaction zone to microwave radiation thereby initiating an electric discharge in said reaction zone, and
   (c) ionizing the methane, carbon dioxide and water reactants whereby at least a portion of the methane and carbon dioxide are converted to carbon monoxide and hydrogen.

2. The method of claim 1 wherein the plasma initiator is a metal, a non-metal other than silica or a composite of metal and non-metal.

3. The method of claim 2 wherein the metal is tungsten, iron, nickel, copper, their alloys, or mixtures thereof.

4. The method of claim 3 wherein the metal is tungsten, iron or mixtures thereof.

5. The method of claim 2 wherein the non-metal is calcium aluminate, carbon, iron oxide or mixtures thereof.

6. The method of claim 1 wherein a plurality of initiators are present in the reaction zone.

7. The method of claim 1 wherein the amount of water is from about 0.1 to about 5 wt%, based on feed stream.

8. The method of claim 1 wherein the methane, carbon dioxide and water are introduced into the reaction zone at pressures of from about 10 Torr to about 15 atm.

9. The method of claim 8 wherein the pressure is from about 1 atm to about 2 atm.

10. The method of claim 1 wherein the methane containing feed stream is natural gas, refinery gas or gas streams from a gas producing well.

* * * * *